J. W. CHENEY.
FRUIT GRATING MACHINE.
APPLICATION FILED JAN. 2, 1912.
1,021,969.
Patented Apr. 2, 1912.
3 SHEETS—SHEET 1.
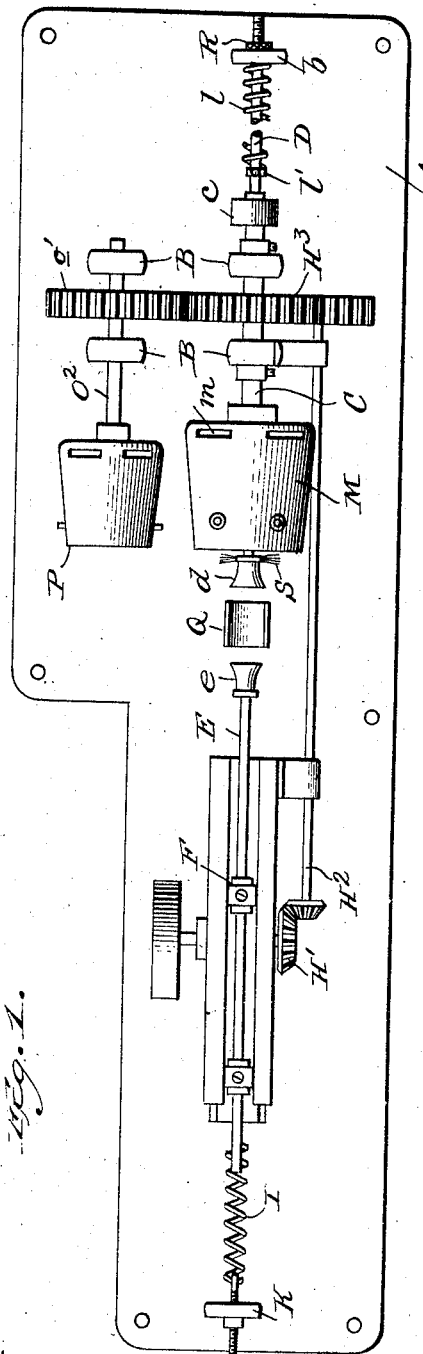
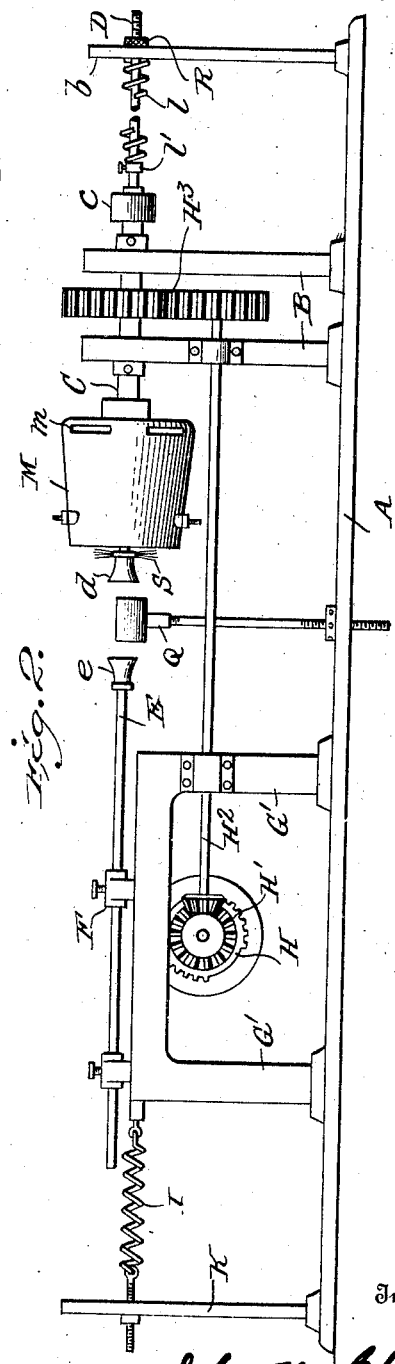
Witnesses
Inventor
John W. Cheney
By Church & Church
his Attorneys

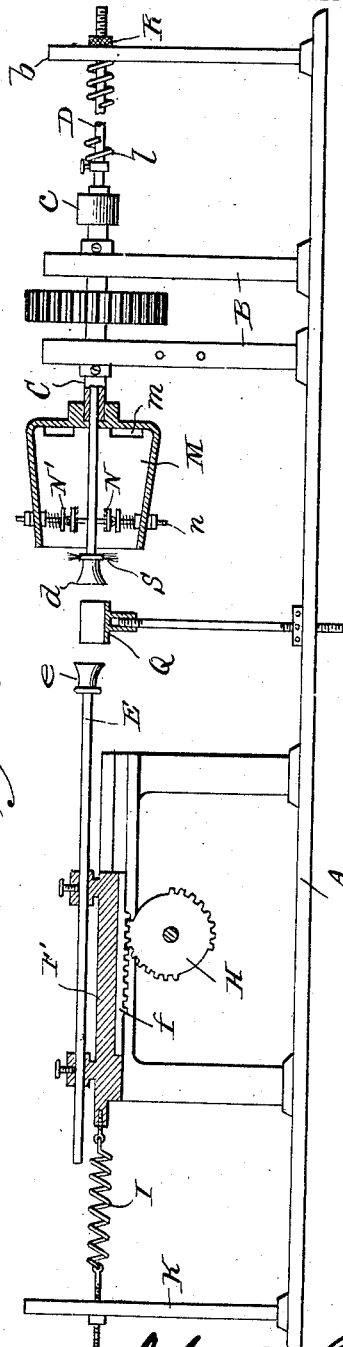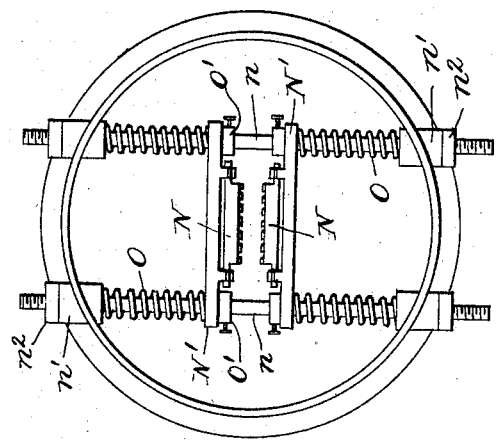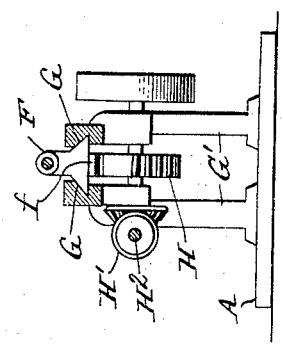

J. W. CHENEY.
FRUIT GRATING MACHINE.
APPLICATION FILED JAN. 2, 1912.
1,021,969.
Patented Apr. 2, 1912.
3 SHEETS—SHEET 3.
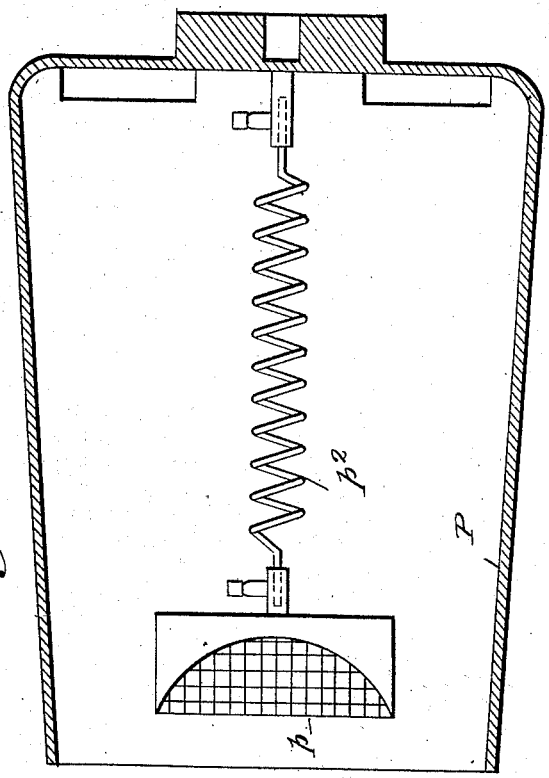
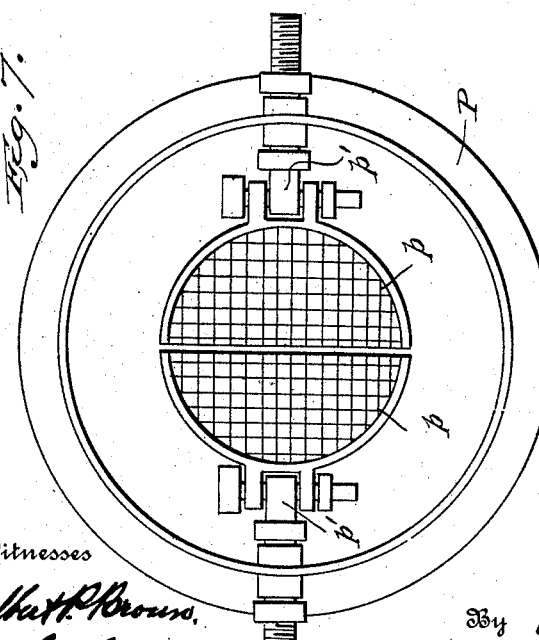
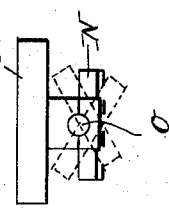
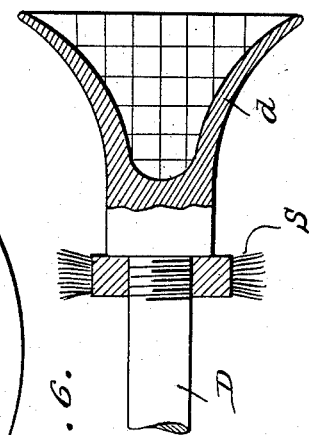
Witnesses
Inventor
John W. Cheney
By Church & Church
his Attorneys 1,021,969. FRUIT-GRATING MACHINE. JOHN W. CHENEY, Los Angeles, Cal., assignor of one-half to Andrew J. Killeen, Los Angeles, Cal. Filed Jan. 2, 1912. Serial No. 669,070.

*To all whom it may concern:*

Be it known that I, JOHN W. CHENEY, a citizen of the United States, and resident of Los Angeles, in the county of Los Angeles and State of California, have invented certain new and useful Improvements in Fruit-Grating Machines; and I do hereby declare the following to be a full, clear, and exact description of the same, reference being had to the accompanying drawings, forming part of this specification, and to the figures and letters of reference marked thereon.

This invention relates to machines for removing by a grating operation the epidermis or outer skin of fruit, and more particularly of citrus fruit.

The machine of the present invention embodies generally a rotary grater, the grating surfaces of which are kept advanced, by yielding pressure and means whereby the fruit may be grasped between longitudinally movable carrying members, fed between the grating surfaces and discharged therefrom automatically, the attendant simply having the duty imposed upon him of presenting the fruit to the feeding mechanism, and where desired, of removing by a grating operation those portions of the fruit which were protected by the holding portions of the feeding mechanism.

The invention consists in certain novel details of construction and combinations and arrangements of parts, all as will be now described and pointed out particularly in the appended claims.

Referring to the accompanying drawings,—Figure 1 is a top plan view; Fig. 2 a side elevation; and Fig. 3 a sectional elevation of a machine embodying the present improvements; Fig. 4 is a view corresponding to Fig. 2, but having some of the parts in section in a vertical longitudinal plane; Fig. 5 is an end elevation of one of the grater heads; Fig. 6 is a section on an enlarged scale through one of the fruit holding members of the feeding mechanism; Fig. 7 is an end elevation of the other grating head; Fig. 8 is a section taken longitudinally of the head shown in Fig. 7; and Figs. 9 and 10 are details of one of the graters and of the fruit support, respectively.

Like letters of reference in the several figures indicate the same parts.

While the machine of the present invention may embody a frame of any suitable design or construction, it is illustrated as having a base plate A on which suitable standards B are erected and at their upper ends form bearings for a rotary shaft C. The shaft C carries at one end a grater head to be presently described, and at the other end a pulley $c$ to which power may be applied from any suitable source. The shaft C is a hollow or tubular shaft adapted for the passage of a rod D movable longitudinally, but is held against rotation by any suitable means, such, for instance, as by having its end squared and mounted to work in a suitable bearing in a standard $b$. The rod D is provided at its forward end with a conical or flaring holder $d$ in which one end of the fruit is held during its presentation to the grating head.

Arranged in opposition to the holder $d$ is a second holder $e$ also mounted on the end of a rod lettered E in the drawings, and adapted to be reciprocated longitudinally to bring the holders $d$ and $e$ toward each other and to reciprocate them in unison during the grating operation. The rod E is conveniently adjustably mounted on a carriage F sliding in dove-tailed ways G in suitable standards G' and said carriage is reciprocated intermittently, preferably by means of a mutilated gear and rack drive, the movement of which is secured through suitable driving connections with the shaft C. The carriage is preferably provided on its under side with a rack bar $f$ with which the teeth of a mutilated gear wheel or pinion H are adapted to mesh, and said pinion H is rotated through bevel gears H', shaft H² and spur gears H³ on the shafts C and H², respectively. Reverse movement is imparted to the carriage by an adjustable tension spring, preferably a coil spring I, one end of which is adjustably connected with the standard K and the other end with the rear end of the carriage. The rod D carrying the holder $d$ is held advanced by a coil compression spring $l$ preferably surrounding the rod and bearing at one end against the standard $b$ and at the other end against an adjustable collar $l'$ on the rod D.

With this construction, when the shaft C is rotated the carriage will be reciprocated intermittently and consequently the two holders $e$ and $d$ will first approach each other, and, if a fruit be placed between them, their relative movement will be arrested when the fruit is clamped, but the two heads, together with the fruit, will be advanced, compressing the spring $l$ and forcing the fruit to enter the grating head within which suitable graters are arranged, for the purpose of removing the outer portion of the fruit between the holders.

In the preferred construction, the grater head to which the fruit is presented by the clamping and feeding mechanism, consists of a hollow head M, suitably secured on the end of the shaft C, and preferably of greater diameter at its inner than at its outer end, whereby gratings will tend to travel toward the inner end of the head and may be discharged through openings $m$ at a point away from the grating surfaces and outer end of the head, so as to be out of the way of the attendant, within the head M, and preferably in proximity to its outer open end. It is provided with yielding grating surfaces between which the fruit is forced by the feeding and clamping mechanism. The grating surfaces, which may be of any suitable formation, for removing the outer portion of the fruit are indicated in Fig. 5 by the letter N, and they are preferably pivotally mounted in carriages N', said carriages in turn being mounted to slide transversely of the axis of the head on rods $n$ mounted in and extending in parallelism transversely of the head, on opposite sides of the axis. Springs O serve to advance the carriages and graters toward each other, while adjustable collars O' serve to limit their advance movement and permit of a proper adjustment for the particular fruit being handled. The graters may be readily removed from the carriages by the usual expedient of separating one or both of their bearings, and the axis of each grater is preferably arranged with relation to the grating surface, as indicated at $o$ in Fig. 9, whereby the graters may assume the angles indicated by the dotted lines in said last mentioned figure, to permit of the removal of a larger portion of the surface of round or oval shaped fruit, as well as to insure a proper entry and discharge of the fruit when advanced and retracted by the feeding mechanism. The rods $n$ on which the grater carriages N are mounted are usually supported in bearings or bosses $n'$, and are held in position by nuts $n^2$.

Arranged parallel with the shaft C is a second shaft $O^2$ adapted to be rotated by a spur gear $o'$, meshing with the gear wheel $11^a$. Said shaft carries at its end a second grater head P which substantially conforms in contour and construction to the grater head M, but may, if desired, be of somewhat smaller size. No fruit feeding mechanism is shown in connection with this second grater head, but it is so designed that the attendant may present the fruit thereto manually for the removal of such portions thereof as would be protected by the holders $d$ and $e$ during the presentation of the fruit to the graters of the main head M. The secondary grater head P is preferably provided with concave graters $p$, each of which may substantially conform to a quarter of a sphere, and each pivotally mounted on an inwardly projecting and adjustable support $p'$ mounted in the wall of the head P. The concave graters $p$ are yieldingly supported in normal position by springs $p^2$, Fig. 8, and in operation it will be understood that the fruit is presented against the concave grating faces manually and preferably while being held in the hand of the attendant.

The inner faces of the holders $d$ and $e$ are roughened or provided with projections which will hold the fruit against rotation during the grating operation, and there is preferably arranged a vertically adjustable support Q upon which the fruit may be placed by the attendant in position to be clamped between the holders. It will be understood, of course, that this support Q is properly formed to retain the fruit in position and to permit of the holder $e$ passing through it, for which purpose it may be concave in cross section, as indicated in Fig. 10.

In operation, the fruit placed on the support Q is clamped between the holders $d$ and $e$, and while so clamped, is advanced to and between the graters N, the rapidity of the feeding movement and rotation of the grater head being so proportioned as to remove the desired thickness of the outer portion of the fruit between the holders during the forward and backward movements of the fruit. The holder $d$ is arrested in its reverse movement when it reaches its normal position, by an adjustable stop, such as the nut R on the outer end of the rod, while the holder $e$ continues its movement, thereby leaving the fruit in position where it can be grasped by the attendant and presented by hand to the graters of the secondary head P, so as to remove the outer portion of the ends of the fruit. Means for removing the gratings from the teeth of the grater may be provided in the form of a brush S, secured to the holder $d$ or rod D in position to move through the graters in advance of the fruit itself, during its forward movement and to follow the fruit during its backward movement.

From the foregoing it will be seen that the fruit is advanced to the graters with a steady uniform movement, but is returned quickly to its initial position, inasmuch as the forward movement is secured by the gearing heretofore described, and the reverse movement by a spring which becomes effective the instant the teeth of the mutilated gear move out of engagement with the rack teeth. During the period of rest following the reverse movement of the feeding mechanism the attendant has ample time to place a new fruit in position for being clamped and fed and he may utilize the feeding interval as the time in which to present the ends of the fruit to the graters of the supplemental head.

Having thus described my invention, what I claim as new and desire to secure by Letters Patent of the United States, is:—

1. In a grating machine, the combination with a rotary head having oppositely disposed graters yieldingly mounted therein, of oppositely disposed fruit holding and feeding devices movable toward and from each other to clamp the fruit and movable in unison to present the fruit to the graters in the head, with mechanism for rotating the head and for reciprocating the holders and feeders.

2. In a grating machine, the combination with the cylindrical grating head having internal yielding graters therein, and means for rotating said head, of fruit clamping and feeding mechanism embodying holders movable toward and from each other to clamp the fruit and movable in unison to present the fruit to the graters, driving mechanism for advancing the holders to present the fruit to the graters, and means for returning the holders to normal position.

3. In a fruit grating machine, the combination with the grater head having internal graters yieldingly mounted therein, a spring pressed fruit holder movable axially within the head, a coöperating fruit holder movable toward and from the first mentioned fruit holder, and driving mechanism for reciprocating the last mentioned holder, whereby the fruit will be clamped between the holders and advanced into the grater head, substantially as described.

4. In a grating machine, the combination with the rotary grater head, graters yieldingly mounted within said head, a spring pressed rod extending axially through the head, and a fruit holder mounted on said rod, of an oppositely disposed reciprocatory fruit holder, and means for reciprocating said last mentioned holder, whereby the fruit will be clamped between the holder and advanced into the grater head while so clamped.

5. In a grating machine, the combination with the grater head having internal graters yieldingly mounted therein, a spring pressed holder movable axially into the head, a coöperating oppositely disposed holder, a reciprocatory carriage on which the last mentioned holder is mounted, and means for reciprocating said carriage whereby the fruit may be grasped between the holders and advanced into the grater head in opposition to the tension of the holder advancing spring.

6. In a fruit grating machine, the combination with the rotary grater head, yielding graters mounted within said head, and spring-pressed holder mounted to move axially of the head, of a reciprocatory carriage, a fruit holder adjustably mounted thereon and movable toward and from the grater head, a mutilated gear for intermittently advancing the carriage, and means for returning the carriage to normal position.

7. In a grating machine, the combination with the hollow rotary grater head, graters mounted within said head and fruit holder movable axially into and out of the head, of a spring for holding said fruit holder projected, an oppositely disposed reciprocatory fruit holder, a spring for retracting said last mentioned fruit holder, and gearing for advancing the same, whereby a fruit may be clamped between the holders and advanced into the grater head.

8. In a fruit grating machine, the combination with the rotary grater head, of greater diameter at its inner than at its outer end and having discharge apertures at its inner end, graters mounted within said head, and fruit clamping and feeding mechanism movable into and out of the head for presenting the fruit to the graters.

9. In a fruit grating machine, the combination with the rotary grater head, of greater diameter at its inner than at its outer end, outwardly movable graters, yieldingly mounted within the head, and fruit clamping and feeding holders movable longitudinally of the axis of said head for presenting the fruit to said graters.

10. In a grating machine, the combination with the rotary grater head, graters yieldingly mounted within said head and spring pressed holder mounted to move axially of the head, of a second holder arranged in opposition to said first mentioned holder, a reciprocatory carriage for said second holder, intermittent driving mechanism intermediate the carriage and grater head, and means for supporting a fruit in position to be clamped between the holders.

11. A grating machine embodying a hollow rotary grater head of greater diameter at its inner than at its outer end, whereby gratings are conducted by gravity toward its inner end, and graters mounted within and near the outer end of the head.

12. A fruit grating machine embodying a rotary head, of greater diameter at its inner than at its outer end and with apertures at its inner end for the discharge of gratings, and graters movably mounted within the grater head near its outer end, and means for yieldingly holding said graters advanced toward each other.

13. In a fruit grating machine, the combination with the frame, rotary shaft journaled in said frame and grater head mounted on said shaft and embodying internal graters, of a rod movable longitudinally in the shaft and head, a fruit holder mounted on said rod, a reciprocatory carriage, a second fruit-holder mounted on said carriage in opposition to the first mentioned fruit holder, driving mechanism for advancing the fruit holders in one direction, and springs for moving said holders in the opposite direction.

14. In a grating machine, the combination with hollow grating heads mounted in proximity to each other, driving mechanism for rotating said head and graters yieldingly supported within each of the heads, of a fruit clamping and feeding mechanism arranged in alinement with one of said heads for presenting the fruit to the graters therein, and a fruit support below the level of said fruit clamping and feeding mechanism.

15. In a fruit grating machine, the combination with the hollow rotary grater head, of less diameter at its outer than at its inner end, whereby gratings will be fed by gravity toward the inner end, graters yieldingly mounted within the outer end of the grater head, and means for adjusting said graters toward and from each other to accommodate fruits of different size, of fruit clamping and feeding mechanism movable axially into and out of the grater head.

JOHN W. CHENEY.

Witnesses:
A. E. BAGLEY,
H. H. HARRIS.